United States Patent
Hartmaier et al.

(10) Patent No.: US 7,359,720 B2
(45) Date of Patent: Apr. 15, 2008

(54) MOBILITY EXTENDED TELEPHONE APPLICATION PROGRAMMING INTERFACE AND METHOD OF USE

(75) Inventors: Peter Hartmaier, Woodinville, WA (US); William E. Gossman, Seattle, WA (US)

(73) Assignee: Openwave Systems Inc., Redwood City, CA (US)

( * ) Notice: Subject to any disclaimer, the term of this patent is extended or adjusted under 35 U.S.C. 154(b) by 1216 days.

(21) Appl. No.: 09/973,479

(22) Filed: Oct. 8, 2001

(65) Prior Publication Data

US 2002/0098855 A1  Jul. 25, 2002

Related U.S. Application Data

(63) Continuation-in-part of application No. 09/397,586, filed on Sep. 16, 1999, now Pat. No. 6,301,474, which is a continuation-in-part of application No. 08/720,089, filed on Sep. 27, 1996, now Pat. No. 5,978,672, application No. 09/973,479, which is a continuation-in-part of application No. 09/399,012, filed on Sep. 21, 1999, now Pat. No. 6,317,594, which is a continuation of application No. 08/852,951, filed on May 8, 1997, now Pat. No. 6,181,935, which is a continuation of application No. 08/720,089.

(51) Int. Cl.
*H04Q 7/20* (2006.01)
*H04Q 7/22* (2006.01)
*H04M 1/00* (2006.01)

(52) U.S. Cl. .................. 455/466; 455/455; 455/432.3; 455/550.1; 455/556.2; 455/566; 455/414.3

(58) Field of Classification Search .. 455/414.1–414.4, 455/446, 445, 419, 412.1, 412.2, 413, 416–420, 455/433, 455–557, 560–561, 564, 566, 410–411, 455/422.1, 425, 434, 432.3; 370/400–401, 370/428–429; 379/221.08, 221.09, 221.1, 379/221.11, 221.12, 221.14; 709/202–203, 709/206, 217–219
See application file for complete search history.

(56) References Cited

U.S. PATENT DOCUMENTS 4,757,267 A  7/1988  Riskin
(Continued)

FOREIGN PATENT DOCUMENTS

EP  0851696 A2  7/1998
(Continued)

OTHER PUBLICATIONS

Sevik, M. et al, "Customers in Driver's Seat: Private Intelligent Network Control Point," ISS'95, Apr. 1995, vol. 2, pp. 41-44.
(Continued)

*Primary Examiner*—Meless Zewdu
(74) *Attorney, Agent, or Firm*—Townsend and Townsend and Crew LLP

(57) ABSTRACT

A system and method of for exchanging information between a wireless network and an external system is disclosed. The wireless network detects trigger events related to communications with wireless subscribers. Certain event triggers cause the wireless system to create a message to send to the external system. In response the external system may send information to the wireless system. The wireless system may create messages upon detection of handoff, origination, status, registration or other activity by the wireless subscriber. The invention may also detect trigger events related one mass media broadcasts. An interface translates between the different protocols of the wireless and the external or wireline networks to allow for automatic call redirection. The application can be utilized between many networks and facilitates the utilization of the architecture of a wirelined network and the home location register of the wireless network for various applications on the wireless network.

3 Claims, 4 Drawing Sheets

U.S. PATENT DOCUMENTS

| | | | |
|---|---|---|---|
| 4,847,890 A | 7/1989 | Solomon et al. | |
| 5,159,592 A | 10/1992 | Perkins | |
| 5,353,331 A | 10/1994 | Emery et al. | |
| 5,377,186 A | 12/1994 | Wegner et al. | |
| 5,379,383 A | 1/1995 | Yunoki | |
| 5,418,844 A | 5/1995 | Morrisey et al. | |
| 5,425,090 A | 6/1995 | Orriss | |
| 5,428,665 A | 6/1995 | Lantto | |
| 5,438,568 A * | 8/1995 | Weisser, Jr. | 370/389 |
| 5,440,613 A | 8/1995 | Fuentes | |
| 5,454,032 A | 9/1995 | Pinard et al. | |
| 5,469,496 A | 11/1995 | Emery et al. | |
| 5,474,748 A | 12/1995 | Szabo | |
| 5,481,590 A | 1/1996 | Grimes | |
| 5,490,139 A | 2/1996 | Baker et al. | |
| 5,490,203 A | 2/1996 | Jain et al. | |
| 5,493,692 A | 2/1996 | Theimer et al. | |
| 5,497,412 A | 3/1996 | Lannen et al. | |
| 5,502,757 A | 3/1996 | Bales et al. | |
| 5,506,837 A | 4/1996 | Söllner et al. | |
| 5,506,887 A | 4/1996 | Emery et al. | |
| 5,509,062 A | 4/1996 | Carlsen | |
| 5,513,243 A | 4/1996 | Kage | |
| 5,519,706 A | 5/1996 | Bantz et al. | |
| 5,521,963 A | 5/1996 | Shrader et al. | |
| 5,526,403 A | 6/1996 | Tam | |
| 5,530,736 A | 6/1996 | Comer et al. | |
| 5,530,963 A | 6/1996 | Moore et al. | |
| 5,533,026 A | 7/1996 | Ahmadi et al. | |
| 5,533,114 A | 7/1996 | Ballard et al. | |
| 5,537,610 A | 7/1996 | Mauger et al. | |
| 5,542,094 A | 7/1996 | Owada et al. | |
| 5,544,226 A | 8/1996 | Weis et al. | |
| 5,544,227 A | 8/1996 | Blust et al. | |
| 5,579,535 A | 11/1996 | Orlen et al. | |
| 5,602,991 A | 2/1997 | Berteau | |
| 5,708,702 A * | 1/1998 | De Paul et al. | 379/221.1 |
| 5,742,668 A * | 4/1998 | Pepe et al. | 455/415 |
| 5,742,905 A * | 4/1998 | Pepe et al. | 455/461 |
| 5,751,707 A * | 5/1998 | Voit et al. | 370/384 |
| 5,768,509 A * | 6/1998 | Gunluk | 709/203 |
| 5,774,534 A | 6/1998 | Mayer | |
| 5,787,395 A | 7/1998 | Minamino | |
| 5,826,193 A | 10/1998 | Ghisler et al. | |
| 5,867,780 A | 2/1999 | Malackowski et al. | |
| 5,867,788 A * | 2/1999 | Joensuu | 455/445 |
| 5,898,917 A * | 4/1999 | Batni et al. | 455/564 |
| 5,901,359 A | 5/1999 | Malmstrom | |
| 5,905,719 A | 5/1999 | Arnold et al. | |
| 5,960,340 A | 9/1999 | Fuentes | |
| 5,974,447 A | 10/1999 | Cannon et al. | |
| 5,978,672 A | 11/1999 | Hartmaier et al. | |
| 6,011,975 A | 1/2000 | Emery et al. | |
| 6,041,045 A | 3/2000 | Alterman et al. | |
| 6,049,711 A | 4/2000 | Ben-Yehezkel et al. | |
| 6,078,820 A | 6/2000 | Wells et al. | |
| 6,161,128 A * | 12/2000 | Smyk | 709/205 |
| 6,181,935 B1 | 1/2001 | Gossman et al. | |
| 6,301,474 B1 | 10/2001 | Hartmaier et al. | |
| 6,317,594 B1 | 11/2001 | Gossman et al. | |
| 6,560,456 B1 * | 5/2003 | Lohtia et al. | 455/445 |
| 2001/0056473 A1 * | 12/2001 | Arneson et al. | 709/217 |

FOREIGN PATENT DOCUMENTS

| | | |
|---|---|---|
| EP | 0851696 A3 | 7/1998 |
| EP | 1 185 062 A2 | 3/2002 |
| WO | WO 93 18606 A1 | 9/1993 |
| WO | WO 95 26114 A1 | 9/1995 |
| WO | WO 96/13949 * | 5/1996 |
| WO | WO 96 13949 A1 | 5/1996 |
| WO | WO 98 11744 A1 | 3/1998 |
| WO | WO 98 34422 A2 | 8/1998 |
| WO | WO 98 34422 A3 | 8/1998 |
| WO | WO 98/51097 | 11/1998 |
| WO | WO 98 51097 A2 | 11/1998 |
| WO | WO 98 51097 A3 | 11/1998 |
| WO | WO 00/72612 A1 | 11/2000 |
| WO | WO 01/20921 A1 | 3/2001 |

OTHER PUBLICATIONS

Ramarao B C V, "Role of Application Gateways in A Global Intelligent Network," Proceedings of the International Council for Computer Communication Intelligent Networks Conference, May 4, 1992, pp. 358-367.

European Search Report issued for EP 02 25 6885, dated Feb. 25, 2005.

* cited by examiner

MOBILITY EXTENDED TELEPHONE APPLICATION PROGRAMMING INTERFACE AND METHOD OF USE

RELATED APPLICATIONS

This application is a continuation-in-part of allowed application Ser. No. 09/397,586, entitled MOBILITY EXTENDED TELEPHONE APPLICATION PROGRAMMING INTERFACE AND METHOD OF USE, filed Sep. 16, 1999 and to be issued as U.S. Pat. No. 6,301,474 on Oct. 9, 2001, which is a continuation-in-part of Ser. No. 08/720,089 U.S. Pat. No. 5,978,672, entitled MOBILITY EXTENDED TELEPHONE APPLICATION PROGRAMMING INTERFACE AND METHOD OF USE, filed on Sep. 27, 1996, and issued Nov. 2, 1999; and this application is also a continuation-in-part of application Ser. No. 09/399,012 entitled SYSTEM AND METHOD FOR PROVIDING DATA TO A WIRELESS DEVICE UPON DETECTION OF ACTIVITY OF THE DEVICE ON A WIRELESS NETWORK, filed Sep. 21, 1999, now U.S. Pat. No. 6,317,594, which is a continuation of U.S. Ser. No. 08/852,951 U.S. Pat. No. 6,181,935, entitled MOBILITY EXTENDED TELEPHONE APPLICATION PROGRAMMING INTERFACE AND METHOD OF USE, filed May 8, 1997, and issued Jan. 30, 2001, which is a continuation-in-part of Ser. No. 08/720,089 U.S. Pat. No. 5,978,672 identified above. Each of these application names the same inventors as the present application.

BACKGROUND OF THE INVENTION

The written description uses a number of acronyms to refer to various services and system components.

Advanced Intelligent Network (AIN): The architecture of the wireline switched network (fixed wired telephones) that allows enhanced and customized services to be provided by the carriers.

Wireless Intelligent Network (WIN): The architecture of the wireless network switched(mobile telephones) that allows enhanced and customized services to be provided by the carriers. The network automatically tracks the location of the mobile telephone. It includes all networks commonly referred to as cellular or PCS.

Home Location Register (HLR): The application that acts as the central repository of the profile of each mobile and maintains the current location and status of the mobile unit.

Service Control Point (SCP): Defined in the Bellcore definition of intelligent networks, this network element is defined to be the device where services are controlled. In practice, the SCP will run applications that provide the services. The HLR is a service application that executes on the SCP. SCP applications are involved in the routing of a call.

Intelligent Peripheral (IP): A generic term for any of a number of devices that provide services but are not involved in the routing of the call. They may use information available from SCP based applications, and they may send messages to these or update profile files in the mobile's data record, however, switching elements are not expected to launch inquiries to IP's in order to determine the correct routing of the calls.

Mobile Switching Center (MSC): Defined in the Bellcore definition of intelligent networks as the network element that is responsible for the actual circuit switched connection of the voice channels. In the general sense, the MSC makes very few routing decisions, obtaining all those from the SCP applications. In practice, there are may basic routing decisions that are made by the MSC and the practice reduces the network load and processing load to the SCP.

Private Branch Exchange (PBX): A telephone switching system located on the end user's premises that allows local intercommunication with all local telephone sets and with the public network.

Local Area Network (LAN): A communication system that interconnects a number of computer processing units when those units are some distance away from one another, but within the same contiguous property to allow private communications facilities to be installed. For the purposes of this document, LAN shall also include the facility to allow multiple computer processors to communicate with each other when some or all of those processors are within the same enclosure and connected by a common backplane.

Signaling Transfer Point (STP): A Bellcore defined network element that is responsible for the correct routing of network signaling messages.

Visitor Location Register (VLR): An application that executes on the MSC which contains a temporary copy of the mobile telephones profile obtained from the HLR. It is stored locally to improve performance.

Personal Communications Service (PCS): This term is used widely in the industry to mean a number of things. For the purposes of this document, it will refer to the latest set of cellular frequencies made available in North America in the 1.9 GHZ range. Therefore a PCS network is one where the 1.9 GHZ set of frequencies are being used. The document does not differentiate between PCS and cellular as a service and any difference between the two is not material to this invention.

Telephone Company (TELCO): The common carrier providing the wired service including the connection to the public switched telephone network (PSTN).

Mobile Identity Number (MIN): The telephone number of the mobile device. It is the primary identifier of the data profile contained in the HLR.

Internet: An open, global network of interconnected commercial, educational and governmental computer networks which utilize a common communications protocol.

HDML: Hand-held Device Markup Language.

SMS: Short Message Service.

Wide Area Network (WAN): A communication system that interconnects a number of computer processing units when those units are to an extent geographically diverse. Often, Wide Area Networks include public (shared user) networks.

Signaling System 7 (SS7): A call signaling system for wireline telephony networks. SS7 provides two major capabilities: fast call set-up and transaction capabilities associated with remote database interactions.

X.25: The X.25 protocol, adopted as a standard by the Consultative Committee for International Telegraph and Telephone (CCITT), is a commonly-used network protocol. The X.25 protocol allows computers on different public networks to communicate through an intermediary computer at the network layer level.

Interim Standard 41 (IS-41): Interim Standard 41 is a signaling protocol used in the North American standard cellular system.

The current cellular, PCS or any public wireless telephony network is now based on a design model defined by the Wireless Intelligent Network (WIN) architecture. This section defines why this model is used and what it details. We then show how the subject invention is used to enhance the application delivery mechanism of new features and services in the WIN.

The concept of intelligent telephony networks was first implemented by the wired (wireline) networks. Under the model of Advanced Intelligent Network (AIN) wireline networks provide centralized control of telephone services provided to subscribers through diversely located central office switching systems. In an AIN type system, central offices send and receive data messages from an SCP via an STP.

In recent years, a number of new services have been provided by the AIN, and other AIN-like networks to provide personalized services to individual subscribers when at home or away from home. It is important to note that any services provided to individuals while they were away from home required the individual to manually register or notify the network of his present location. The network did not, nor does the AIN model provide for, any mobility management based in the network Modifications of the AIN system allow a TELCO to customize the routing of telephone calls via a graphical programming language used on a specialized terminal by TELCO personnel.

Prior art AIN systems are exclusively land line communications systems, i.e. they provide telephone communication services via wired telephone lines. The signaling protocol used for AIN allows only for control of telephone network switching elements in response to processes or software functions that are based on the calling number, called number and other relatively fixed items (time of day, congestion control and end user control, etc). Wired line communications, even those provided by the AIN, are necessarily limited by the fixed nature of installed lines. These systems make no provision for communications with any mobile link, except as taught by Emery et. al. in U.S. Pat. Nos. 5,469,496, 5,506,887.

While AIN is the intelligent processing related to the wireline networks, WIN is the intelligent processing of the wireless networks. In many ways they are similar and have used similar technologies, however, the model for WIN has a significant additional element, that of mobility. In the AIN architecture, both the originating and terminating telephone are assumed to be fixed, while in the WIN architecture, the location of the mobiles must be tracked by the networks. The HLR is the data register that tracks the location of the mobile and contains the subscriber profiles. It is because of this mobility element in the WIN architecture that makes WIN much different from AIN.

The cellular telecommunications industry has developed roaming standards which allow automatic handoffs from one cellular network to another during an established call, and to allow roaming from one system to another while having incoming calls follow the customer to the visited system. A protocol which accomplishes this is set out in the EIA/TIA standard IS-41. The IS-41 protocol is an out-of-band signaling protocol which may be transported by either X.25 or SS7 links.

The link between the mobile cellular user and the appropriate base station uses particular radio frequencies mandated by appropriate regulatory bodies. Dedicated trunk lines serve as the link between the base station and the MSC, and the interface between MSCs within the same system (same cellular carrier) is generally provided by dedicated land lines. Data links connect the mobile switching center to a VLR, and HLR, which can be located at the mobile switching center or at a remote point. Only the HLR may serve more than one MSC, the VLR is dedicated to the MSC that currently has control of the mobile. The subscriber record is erased when the mobile is no longer active or has moved to another MSC. The HLR is the location register which contains the user identity, such as directory number, profile information (feature list), current location, and validation period. The VLR is the location register, other than the HLR in which an MSC temporarily stores and retrieves information regarding a visiting subscriber or user. The difference between the VLR and the HLR is simply that the HLR is the permanent storage place for the subscriber record while the VLR is a temporary storage place used during a configurable time. The use of the VLR reduces the amount of network signaling needed to process the call handling.

Many mobility controllers of the above described cellular systems are now programmed to provide subscribers selected special services. Until recently, such roaming subscribers engaged in the special feature calls required special support by the system and would not be handed off between systems without losing these special features. If the mobile subscriber had roamed to another system and registered on that system, the special features did not necessarily follow the subscriber. Data networks, such as SS7 networks, interconnect the mobility controllers with each other for data communications, for example to transfer necessary data from a subscriber's HLR to a VLR in the mobility controller the subscriber's mobile station is currently communicating with.

To enable seamless roaming for subscribers who use special services, the Wireless Intelligent Network (WIN) was developed. The WIN was developed as an extension to the CTIA's reference model. The first capability centers around consolidation of the network's location functions. Secondly, the network must have a robust SCP platform that runs multiple applications, and thirdly, the network must be enhanced by new "primitive" capabilities. A key enhancement to the WIN was realized by adding Service Control Function (SCF) functionality to the reference model. The SCF function replaced the HLR in the model and the HLR was redefined as an application using the SCF.

The WIN comprises three unique components. An MSC switch functionality which provides call processing (including inherent Service Switching Point (SSP) capabilities), and features including call waiting, call forwarding, and three way calling. Secondly, the system also provides EIA/TIA IS-41 SS7 message protocol providing intersystem handoff, automatic call delivery, automatic roaming and, most importantly, remote feature access. Thirdly, the WIN SCP provides mobility management, and a platform for hosting service logic (network applications).

Traditionally, the architecture of wireless networks places the burden of hosting new service applications on the mobile switch (MSC). MSCs are an extremely expensive network element, and are typically limited in the computing and database capacity needed to host new services and therefore are not well suited to support growth. By adopting the WIN architecture, wireless carriers place more network intelligence and mobility management functionality into SCPs. The WIN architecture is currently under deployment by various cellular carriers, and is suited for use in all cellular and PCS networks.

Currently, a dominant WIN SCP solution places service applications, such as software defined networks and messaging centers, within the same processing environment as essential network software elements such as authentication center (AC) and HLR. Given that ultra-high availability software such as AC and HLR functions operate with those requiring less reliability, such as software defined networks and messaging centers, new applications must reside on overly expensive hardware. This solution, and others like it, are limited by proprietary development environments as third party developers are unable to effectively create applications based on the platform.

Currently, consumers generally have access to wireless networks that offer voice service. In a few cases, carriers who use the WIN architecture and certain PCS carriers, minimal advanced services such as short messaging or voice mail are offered. The primary reason that consumers have such a limited suite of services from which to choose is due to the time and expense of developing services for use on a network wide basis. These services take many months to develop and must be justified by a business case that assumes use by the general population. The subject invention enables new applications to be developed and hosted in a focused, inexpensive and timely fashion to respond to customer demands.

As wireless network providers move from a duopoly to a competitive environment, they are being forced to move to a richer suite of advanced services to stave off the threat of new PCS/PCN service offers. An effective counter to the potential loss of profitability is to quickly develop and implement new service offerings. Also, recently licensed competitive carriers have a large stake in the ability to roll out new services in a timely manner. In the FCC "A", "B" and "C" block 1.9 Ghz spectrum auctions, spectrum winners paid 2 to 3 times the price per pop, or potential subscriber, when compared to the initial FCC cellular spectrum auctions. This portends that the new service providers will have to have operation cost levels that are lower than current cellular carriers in order to be similarly profitable.

Multiple vendors are beginning to develop products to support the WIN architecture. However, three issues must be addressed to meet the challenge of profitable, highly functional wireless networks. First, wireless applications must have a platform for operation that allows custom application tailoring to an individual customer's need, rather than the overall needs of all network users. Second, if this type of customization and scaling are to happen, the cost basis and development paradigm for these wireless applications must change dramatically. Third, billing and provisioning systems must be adapted to allow carriers to manage a new level of service flexibility and customization.

The subject invention allows new applications to be developed that will utilize the primitives of information contained in the SCP applications to develop additional and highly custom applications.

Recent industry activity has indicated a need for an open operating environment for creation of new applications, and a more distributed architecture for hosting these applications. The subject invention was created in response to this activity. Further, Motorola Corp. has introduced the Memos™, software platform to address this need. Memos™ is an open software operating environment designed to enable economical wireless communications to a broad range of users. This solution is designed and targeted for personalized messaging applications. This represents a subset of all wireless applications. Additionally, Memos™, does not provide a convenient means for development as it uses a proprietary Motorola scripting language, rather than an industry standard telephony API for application development. Finally, Memos™, does not include a means for using information contained in an IS-41 message for customizing message delivery.

The subject invention allows new applications to be developed that will utilize the primitives of information contained in SCP- and switch-based applications and databases, and carried via IS-41 messages, to develop additional and highly custom applications. Among the types of highly custom applications that can be developed and implemented using the subject invention are: enterprise network interconnections, information delivery applications, and enhanced intelligent network applications. The architecture of the subject invention enables these and other applications to inter-work, and share processing and user interface capabilities.

Further, the subject invention, based on the use of an intelligent router or gateway server, improves upon current solutions by enhancing networking efficiency. The subject invention treats an enterprise network or application adjunct as if it were an individual MSC, with HLR/VLR capabilities. However, in current solutions, each application would be required to possess a unique SS7 point code. Instead, the gateway server has an SS7 "point code" and routes messages from this router to individual applications based on a mapping of subscriber information to an application adjunct. This reduces the burden placed on a carrier's SS7 network, and reduces the cost of implementing advanced network services by using more ubiquitous TCP/IP transmission capability.

Another capability of the subject invention relates to targeted information delivery, based on information obtained from a cellular or PCS network. Certain information can be delivered based on primitives of information contained within the cellular network. This information can be formatted, delivered and used in many ways. For example, many Internet World Wide Web sites, such as the Federal Express site, provide valuable information to people. The site provides package tracking information. A person can input their package tracking number and receive updated information on the status of their package.

Obtaining information from World Wide Web sites continues to grow at an incredible rate. The main way to acquire information from the Internet is through a computer which is connected directly to the Internet or is connected via an Internet service provider's (ISP) dial up connection service. And although some new services are being introduced that automatically bring information to the computer from the WWW, for example, the PointCast Service, the major means for accessing WWW information on the computer is by searching for information. If it is commonly accessed WWW sites, bookmarks are often used to provide ease and speed of information retrieval.

A new capability for acquiring instant information found on the World Wide Web can be developed and delivered through a wireless handset without having to search the WWW on a computer. This capability will allow a subscriber to organize automatic information agents to search for information on the WWW and then send the desired information to the subscriber through the Wireless Intelligent Network and the wireless carriers' sophisticated wireless handsets and switching capabilities. Information delivery can be conditioned based upon logic relating to status information and messages from a WIN. This information can be delivered in the form of a short message (SMS), or in handheld device markup language (HDML), or in the form of an "applet" using appropriate programming languages such as Java by Sun Microsystems.

Additionally, a convenient means for implementing advanced number translation services is currently a requirement of cellular and PCS networks. A method of implementing reduced digit dialing, or closed user groups, based on mobility related information is a valuable service. This service would provide the ability for a wireless carrier to offer subscribers use and access to a newly established wireless network of wireless and wireline telephone numbers. This network allows subscribers to add frequently dialed numbers to a network database; and then dial only four or seven digits (any predetermined short number sequence) regardless of where the caller is calling from. Information from the wireless network, such as certain IS-41 messages, determines the appropriate exchange, area or country codes and adds these additional codes on to the dialed number as required. The subject invention provides an optimal means for implementing this service.

In prior art systems if a subscriber is unable to receive calls on a wireless device, or if the subscriber is not active on the wireless device, but wishes to have the calls sent to a specific device only if the subscriber is available at that new device, the subscriber must manually set the call-forward-immediate feature of the wireless device to have calls forwarded to another device, such as an office telephone. Therefore, if the subscriber desires to receive all incoming calls on the telephone in his or her office, then he or she must manually set the call-forward feature of the wireless device in order to receive calls that are directed to the wireless device. If the subscriber forgets to get the call forward feature, then calls to the wireless device will not be forwarded. Moreover, in prior art systems once the call forward feature is set, all calls to the wireless device continue to be forwarded to the wireline telephone even if the subscriber has left the office. Thus, once the user becomes inactive on the wireline phone and wants to receive calls on the wireless system again, he has to manually disable the wireless device's call forward feature.

Moreover, prior art systems do not provide call screening for calls forwarded from the wireless phone to the office wireline extension. Thus, all calls made to the wireless phone are forwarded to the wireline phone when the call-forward feature of the wireless phone has been manually set. This may not be a desirable arrangement if the subscriber does not want to be interrupted in the office by calls from a preselected group or at certain times of the day.

Prior art systems also do not provide for the interconnection of data applications executing in private networks with WIN signaling and control networks to make data applications WIN aware.

Accordingly, it is an object of this invention to provide an improved combined network system consisting of both a private network and a wireless network wherein the private network appears as a node on said wireless network and allows open architecture applications on said private network to run on said wireless network.

It is a further object of this invention to provide a system whereby fixed telephones, associated with a mobile telephone, to be acquired by a mobile network management system as if they were mobile telephones themselves.

It is yet another object of this invention to provide a method of connecting private network based applications to network based applications in both AIN and WIN models.

Another object of this invention is to make a private wired or wireless, or combination network (WAN or LAN) logically appear to the cellular (WIN) network or wireline (AIN) as an extension of the network.

A further object of the invention is to reduce the cost of running specialized applications on wireless networks by utilizing portions of a private wireline network in lieu of multiple service control points.

A further object of this invention to provide an improved means for developing and implementing wireless network services, and combined network services consisting of private networks, wireless networks, and information sources and networks such as the internet. This is accomplished by using an open architecture application platform that uses a mobility extended application programmer interface It is a further object of this invention to provide an architecture for efficiently implementing both an open architecture application platform, and a means to interconnect private wireless network applications, and other database applications to wireless networks.

A further object of this invention is to provide a means to allow database and other enterprise applications to access subscriber information (profile, location, etc.) contained within the wireless network.

A further object of this invention is to provide a means for wireless subscribers to have access to enterprise databases, the Internet and other information sources, based on contextual information such as location, time, IS-41 messages or other similar network control messages such as those that indicate presence on, and location in a mobile wireless network.

A further object of this invention is to provide a means for wireless subscribers to have access to enterprise databases, the internet and other information sources, based on event triggers in these data sources, such as a change in product availability status, or a change in a stock price, logically combined with IS-41 messages or other similar network control messages such as those that indicate presence on, and location in a mobile wireless network.

A further object of this invention is to provide an improved means of implementing reduced digit dialing, or closed user groups, based on mobility related information, such as IS-41 messages indicating location in a mobile wireless network.

It is an object of this invention to provide an improved combined network system consisting of both a wireline network and a wireless network wherein the wireline network appears as a node on said wireless network and allows open architecture applications on said private network to run on said wireless network.

It is a further object of this invention to provide a system whereby wireline telephones may be treated by a mobile network management system as if they were mobile telephones assigned to the wireless network.

It is yet another object of this invention to provide a method of connecting wireline or private network-based applications to network based applications in both AIN and WIN models.

A further object of the invention is to reduce the cost of running specialized applications on wireless networks by utilizing portions of a private wireline network in lieu of multiple service control points.

A further object of the present invention is to provide an automatic call redirection system between a wireless and a wireline network.

A further object of the present invention is to detect when a user is active on a wireline telephone and to automatically forward calls from a wireless phone to a wireline telephone when the user is active on the wireline phone.

Another object of the present invention is to detect when a user becomes inactive on a wireline telephone and to automatically forward calls from the wireline telephone to a wireless telephone.

A further object of the present invention is to provide call screening for calls forwarded between wireline and wireless networks.

It is an object of the present invention is to provide for routing and control of calls in a wireless and/or wireline network based upon mass media events.

Prior patents related to the subject invention are discussed below:

Fuentes (U.S. Pat. No. 5,440,613) describes a method and apparatus for using an automatic PBX as a switching system for use in a cellular wireless telecommunications system. The invention uses a protocol converter, which communicates with a wireless cell site, that converts messages between ISDN protocol and a protocol for communicating with the wireless cell site. The Fuentes invention does not anticipate the subject invention, as the subject invention does not utilize the switching elements of a PBX to control the cellular communications network. Rather, the subject invention improves upon this art, as it utilizes existing WIN network elements, including MSCs, and uses a processor to establish a LAN as an element of a larger cellular WIN. The subject invention may utilize a PBX as an application that is networked with the larger WIN, but it does not rely upon the switching capability of the network to control mobility. Fuentes has replaced MSC with a PBX and uses ISDN as the protocol to establish control. The subject invention allows applications on the private network (LAN, WAN) to communicate with the network-based SCF applications (e.g. HLR) to provide a programming interface.

Another set of inventions, Pinard et al. (U.S. Pat. No. 5,454,032) and Jones (U.S. Pat. No. 5,474,748) describe a form of connection between multiple telephony devices, including PBXs and wireless networks, but does so only to establish contact at a particular device, and not to enable any WIN mobility features. Pinard teaches a method of establishing a telephone communications link from a calling line to one of plural peripheral devices associated with a single telephone number in a central office telephone switching system or PBX. This invention provides a means for establishing a connection with a particular device where several communications devices are associated with a single number. This invention does not utilize or anticipate use of mobility features associated with a WIN, or the ability to create sub-elements of the WIN via connections with a LAN or WAN. Jones teaches a method of outdialing to a number of devices to test completion of a connection. This is performed via an algorithm that sequentially dials various devices to try to complete the connection. This approach as with the Pinard approach does not anticipate the use of mobility management capability by connecting a LAN and a wireless network. Furthermore Jone and Picard do not provide for the interconnection of applications.

Emery et al. (U.S. Pat. Nos. 5,469,496, 5,506,887) teaches integration of wireless and landline phones using the AIN wireline system to connect and control processing of calls to a PCS subscriber's wireless handset via a home base station or a wireless communication network. In the case of the Emery invention, specialized services are seamlessly provided by connections between a wireless (including cellular) network and a wireline AIN. This invention clearly does not anticipate the functionality of using a connection between a WIN and a customer premises based applications, such as a PABX. The Emery invention (U.S. Pat. No. 5,506,887) teaches that connections between a wireless network and a Centrex or PBX are made between MSCs and wireline switches, and not a SCP or a sub-SCP as contemplated in the subject invention. Also, the Emery invention does not facilitate mobility management on the private wireline network (LAN or WAN) via a logical HLR function contained within the LAN or WAN. Furthermore, the Emery invention does not anticipate the ability to customize and host new applications for the WIN on the customer premises LAN or WAN, but rather anticipates hosting applications on central wireline telephony AIN service controllers. The subject inventions provide for an interface between applications resident on the LAN, WAN or other network or processor and WIN based applications. Both Emery inventions do not contemplate linking applications located outside of the AIN.

Bales et al. (U.S. Pat. No. 5,502,757) teaches use of a number of terminal service profiles that are selected on the basis of the switching system to which a wireless mobile unit is registered. The Bales et al. invention allows distinct service activation based on the switching system that a mobile terminal unit is registered. This invention does not anticipate interconnection of wireless and wireline networks via a WIN architecture, nor does it anticipate using inherent mobility information contained with a WIN architecture to determine service provision. Those skilled in the art will recognize Bales' teaching as features provided in the public standard IS-41C. The DNA function is easily recognized as the HLR application. With this version of the protocol the HLR will have specific location information and will be able to cause the routing of terminating or originating calls to be modified based on the location of the mobile. An existing embodiment is the current practice of charging different rates for telephone service depending on the location. These features are obvious to those of ordinary skill in the art and suggest that the Bales patent is too broad and covers obvious extensions to standard protocols.

Mauger et. al. (U.S. Pat. No. 5,537,610) teaches a mobile communications network comprised of a PCS (PCN) network, PBX and local exchange. While the Mauger et. al. invention contemplates connection of a PBX, a local exchange and a public wireless network, it does not utilize an intelligent network architecture to manage mobility information. Furthermore, Mauger et. al. suggests that wireline and wireless network connectivity be established at the wireless network base station. This invention clearly does not anticipate the use of a WIN architecture to connect a wireline network (like a PBX) with a wireless network, nor the versatility and generality of the WIN interconnect solution. Mauger manages the routing of calls based on the dialed digits while the subject invention teaches that services and applications can be connected to WIN and does not directly implement new routing services. New routing service can be developed using the subject invention. The subject invention improves on Mauger et al by providing the interface to allow calls from private networks (PABX) to MS that have registered in the HLR as being local to the said PABX to be routed to the Intelligent Base Station (as defined by Mauger et al) even though the dialed digits may indicate that the dialed MS is not local to the PABX.

The following patents have also been reviewed. We have provided summary comparison to the subject invention.

Weis, U.S. Pat. No. 5,544,226 teaches control wireless stations from a PBX. Does not interconnect applications and provide for new applications.

Ballard, U.S. Pat. No. 5,533,114 describes a method of switching cellular calls locally rather then transmitting then to a switching center that could be some distance away. Does not interconnect applications and provide for new applications.

Moore, U.S. Pat. No. 5,530,963 describes a method of routing datagrams to mobiles. This is an invention at the transport level not the application interface.

Owada, U.S. Pat. No. 5,542,094 describes a method of controlling mobiles using an ISDN interface to the local switch. This is an invention at the transport level, not at the application interface.

Tam, U.S. Pat. No. 5,526,403 describes a telephone set capable of receiving both cellular and land line telephone calls. This invention pertains to a new device.

Jain, U.S. Pat. No. 5,490,203 describes a method of locating a mobile user when the telephone handset is not the same unit as it is in cellular. This invention relies on monitoring calls and on now proactive action by the user. The subject invention will enhance this feature by allowing simply applications to be written that will detect the presence of the nomadic user. The cellular PBX interconnect embodiment locates nomadic users be assuming that when their telephone is used they are there. It does not track calls in the same method as proposed by Jain.

Shrader, U.S. Pat. No. 5,521,963 describes a method for connecting and controlling mobiles through the use of a key system. This invention deals with mobile to basestation hand-off and is a transport level invention.

Carlsen, U.S. Pat. No. 5,509,062 describes a method of storing new numbers into a telephone when that telephone is idle. This is a transport level invention and deals with routing of calls.

Comer, U.S. Pat. No. 5,530,736 describes a method of having more than one telephone number (MIN) in a mobile phone. The subject invention makes no claims on such functionality of mobile phones.

Blust, U.S. Pat. No. 5,544,227 describes a method for connecting mobiles to a PBX. The subject invention makes no claims on such connection of mobiles sets to PBX systems.

Kage, U.S. Pat. No. 5,513,243 describes a method of locating mobiles by using the relative field strength of overlapping cells. The subject invention makes no claims on such techniques of locating mobiles.

Theimer, U.S. Pat. No. 5,493,692 describes a method of routing messages based on the content of those messages. The subject invention is broader in scope by providing a general interface between application and the network. In a specific embodiment of the subject invention, an EMAIL system could use the context of the message together with the status or profile information gathered from the network using the subject invention to make better message routing decisions. The subject invention allows for greater scope in the Theimer invention and improves upon it.

Grimes, U.S. Pat. No. 5,481,590 describes a method of signaling the telephone system as to which terminal device should be used to complete calls to the actual user. The subject invention only assumes one method of locating the user. The Grimes method could be used to facilitate such notification. Once the subject invention has such notification, it will signal the wireless network. The subject invention does not claim a method of notification.

Lannen, U.S. Pat. No. 5,497,412 describes a method of delivering calls to roaming mobiles using IS-41 A while still maintaining connection to non-IS-41 networks. The subject invention meaning assumes that a standard signaling protocol is available to the SCP and SCP based applications. While the information provided by the subject invention will assist in the delivery of calls, the subject invention makes no similar claims.

Sollner, U.S. Pat. No. 5,506,837 describes a method of interconnecting bunked mobile and cellular systems. The subject invention makes no such claims.

Morrisey, U.S. Pat. No. 5,418,844 describes a method of providing information services to callers based on the specific N11 type number dialed and the calling number profile. The subject invention does not depend on the dialed number, and it is an application interface at the local end of the connection.

Lantto, U.S. Pat. No. 5,428,665 describes a method to reduce the transaction impact on the HLR by having special services defined in a list at the MSC/VLR. Only if the requested service is not available at the MSC/VLR is a message sent to the HLR. The subject invention has no requirements or claims on the MSC or VLR. The subject invention in one embodiment, will allow the PBX to be acquired by the SCP as another MSC and will respond to messages in the same format.

Perkins, U.S. Pat. No. 5,159,592 describes to connection of data devices in a mobile environment. It is based on the management of unique network addresses. The subject invention makes no claims to manage network address in this manner.

Wegner, U.S. Pat. No. 5,377,186 describes a method of using the ISUP protocol instead of TCAP message to provide enhanced services to the local switch. The subject invention improves on this art by allowing any protocol to be connected to applications developed on LAN based processor to be connected to the SCP or switch. Wegener teaches a method of sending messages for the purposes of switching the call, whereas the subject invention provides the means to develop new and specialized services and does not directly involve switching the call.

Orris, U.S. Pat. No. 5,425,090 describes a method of providing enhanced 800 services based on the response from the 800 database. While an embodiment of the subject invention would be able to launch messages to the 800 database, the responses would be used to support enhanced applications and not to directly route the calls.

Yumoki, U.S. Pat. No. 5,379,383 describes a method of service control by storing specific service feature information. The subject invention allows application at the local (LAN) to be connected to network databases so that existing stored records can be accessed and not duplicated.

Bantz et al, U.S. Pat. No. 5,519,706 describes a method for registering new stations in a communications system.

Baker et al, U.S. Pat. No. 5,490,139 describes a system having a routing network architecture for efficiently handing off rousing without changing operating systems Ahmadi et al, U.S. Pat. No. 5,533,026 describes a mobile network having the ability to update topology so location of mobile unit is known to all routers of the network.

BRIEF SUMMARY OF THE INVENTION

These and other objects, features and technical advantages are archived by a system and method that provides the programming interface between applications executing on a private data network and application executing in the WIN. The present invention also allows for automatic call redirection between a wireless and wireline communications system, including a method and system for automatically determining when a particular wireline extension is active.

The subject invention provides a means for enterprise network applications and other database applications and services to access subscriber data contained in the WIN.

The subject invention provides a means for an enterprise network database, an Internet or Intranet based, information source, or other data source to send or receive information to a mobile subscriber based on certain activities in the cellular network, such as an IS-41 Origination Request message that signifies that a subscriber has dialed a number, or other messages that signifies that a subscriber has entered a network.

The subject invention provides a means for an enterprise network database, the Internet, or an Intranet based information source, or other data source to send or receive information to a mobile subscriber based on certain activities and triggers in the data source, and activities and triggers in the WIN.

The subject invention provides an improved means for implementing reduced digit dialing, or closed user groups, based on mobility related information.

The subject invention allows fixed or wireline telephones, associated with a mobile telephone, to be acquired by the mobile network management system as if they were mobile telephones by inferring mobility based on the actions of the fixed telephone. It also provides a method of connecting private network (enterprise) based applications to public, carrier or macro network based applications in both the AIN and WIN models. The subject invention makes a private wired or wireless, or combination, network (WAN or LAN, voice or PBX) logically appear to the cellular (WIN) network or wireline (AIN) as an extension of the network with a "sub SCP" process that provides local mobility or profile information, and links to resident applications (private dialing plans, voice mail, PBX) that reside on other processes having access to the private network.

The "sub SCP" process consists of a process, between the network SCP and the private network-based application, which converts a TSAPI, or other standard link protocol, into the IS-41 protocol, or future WIN protocols, that is supported by the network-based HLR, or to existing remote server call or procedure call functions. The subject invention will allow other applications developed on the private network to extract or even modify the subscriber data stored in the SCP based application and to be enhanced with the added functionality of having knowledge of the subscriber profile stored in the SCP based application. Both versions of the subject invention allow the interconnect of the AIN or WIN profile and WIN mobility information with applications developed and executing locally on a private network.

Further, the open application interface between the wireless network SCP, STP or MSC and the private network-based application, or open application platform which converts a TSAPI, or other standard link protocol, into the IS-41 protocol, or future WIN protocols, that is supported by the network-based HLR, or to existing remote server call or procedure call functions. Applications may be developed on the private network or open application platform to extract or even modify the subscriber data stored in the SCP or switch based application and may be enhanced with the added functionality of having knowledge of the a subscriber profile stored in the network-based application. The subject invention allows the interconnect of the AIN or WIN profile and WIN mobility information with applications developed and executing locally on a private network, or on an open applications platform.

The addressing supported by the subject invention can include standard IP addresses, such as those used by the Internet or Intranets, and future Internet addresses supported by the Internet Protocol Version 6 (IPV6) standard. In particular, a device connected to a network using the subject invention, like a cellular or PCS network, contains a unique identifier, the mobile identity number (MIN), electronic serial number (EBN) pair. This represents a unique network address per device.

Furthermore, the present invention provides automatic call redirection in which calls to a wireless phone are automatically forwarded to a wireline telephone on a PBX system if the user is active on the wireline telephone. This is accomplished by notifying the SCP that the wireline telephone is active so that the SCP can set the incoming call destination to the wireline telephone. In an alternate embodiment, the call-forward-immediate feature of the wireless telephone is automatically set to the number for the wireline telephone. Thereafter, all calls to the wireless telephone are automatically forwarded to the wireline telephone by the HLR. The user is assumed to be active on the wireline telephone if any activity is detected on the wireline telephone. Such activity is detected when the user makes outgoing calls from the wireline telephone, receives an incoming call on the wireline telephone, or simply lifts and replaces the handset on the wireline telephone. Additionally, other activities may imply that the user is active on the wireline telephone.

Similarly, if the user is inactive on the wireline telephone the state of the wireline telephone is changed from active to inactive. In this case, the SP notifies the SCP that the wireline telephone is inactive and calls to the wireless telephone are no longer routed to the wireline telephone. For example, the SP may deactivate the wireless call-forward-immediate feature so that calls to the wireless telephone will no longer be routed to the wireline telephone.

Calls to the wireline telephone are routed to the wireless telephone only when the wireless telephone is in a position to receive a call. If the wireless telephone is active and registered with a cellular network, then it is in a position to receive a call. If both the wireless and the wireline telephones are not ready to receive any call then the call is forwarded to a pre-selected destination, for example, to the user's voice mail.

Reference is made to a TSAPI link which is the Novel's implementation of the Computer Telephony Interface as defined by the European Computer Manufacturer's Association Computer Telephony Application Standard (ECMA CTAS). Other implementation include TAPI (from Microsoft) and proprietary links such as MiTAI from Mitel, Meridian Link from Nortel, and Call Path from IBM.

Additionally, other links from applications supporting client software in the mobile phone, ie. Java from Sun Microsystems, or Windows CE from Microsoft are supported by the subject invention.

Signaling from the private network interface to the network-based HLR will be over X.25, TCP/IP (Internet) or appropriate private virtual circuits (closed user groups) and will use either the current IS-41 protocol (or future revisions or replacements) or proprietary remote service calls and procedures that may be available from specific vendors or the SCP/HLR. This connection will have the effect of acquiring the private network as an intelligent node on the cellular network, complete with its own unique addressing. Its support of the IS-41 protocol or vendor specific processes will ensure that minimal changes in the HLR software will be required and that the subject invention achieves the goal of lower implementation costs.

Furthermore, the "sub-SCP" process can be extended with an SS7 link in order to allow the "sub-SCP" process to serve as a general SCP/HLR in the cellular carrier's network. This will allow carriers to lower operating costs by having a software-based HLR process that can run on lower cost server-class PC's or similar processors. In this instance, it is likely that the SCP process would be located on one of the cellular carrier's own private networks to ensure security and accessibility.

The subject invention achieves reduction in the cost of specialized and custom applications. Currently new applications on the SCP can cost $100,000 to $1 million while new applications developed using the subject invention will cost $1,000 to $100,000 per license greatly reducing the system cost. As a common interface, it will facilitate new inventions and applications that expand the functionality and use of the wireless and wired networks.

Moreover, the invention provides a system and method of for routing and controlling calls in wireless and wireline networks based upon mass media events. The invention detects trigger events related to at least one mass media broadcast. The invention maintains a service application for routing calls. The service application receives dialed digits from a call initiated by a wireless or wireline subscriber. From the dialed digits, the service application determines a particular mass media broadcast and ascertains an occurrence of a predefined event associated with the broadcast. Based upon the occurrence of the predefined event among other factors, the service application determines an appropriate number to reroute the wireless call.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

The foregoing has outlined rather broadly the features and technical advantages of the present invention in order that the detailed description of the invention that follows may be better understood. The additional features and advantages of the invention described hereinafter form the subject matter of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

These and other objects of the invention will become readily apparent when reference is had to the accompanying drawings in which.

DETAILED DESCRIPTION

Figure 1:
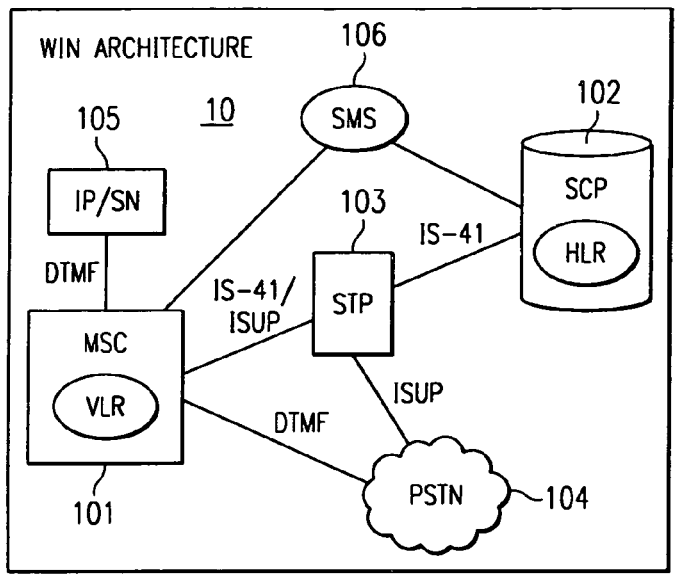
FIG. 1 is a block diagram of the Wireless Intelligent Network (WIN) architecture.

FIG. 1 represents the Wireless Intelligent Network (WIN ) architecture. An MSC 101 is the Mobile Switching Center or telephone switching system. It switches the voice channels between cell site trunks and/or land line connection. The MSC connects to an STP 103. Architecturally, STP 103 is shown as a separate unit, however, it has been implemented directly on the same hardware platform as the MSC. STP 103 transfers messages to other STP's for routing to other STP's, MSC 101, SCP 102 or other network elements.

SCP 102 manages applications. An example of an application executing on the SCP 102, is the HLR, or Home Location Register. The HLR stores user profile which include such items as Electronic Serial Number (ESN) of the mobile phone, Mobile Identification Number (MIN), current location, validation period and services that are authorized.

STP 103 is connected to the PSTN 104 via the signaling links. MSC 101 is connected to the PSTN 104, or public switched telephone network by the voice channels and signaling that has been agreed to between the mobile carrier and the PSTN operator.

Additional elements of this representative network are the intelligent peripheral/service node, IP/SN 105 and a Service Management System peripheral SMS 106. The IP is a generic term for various processors that supply specific functions (voice mail, short message service, etc.). IPs do not switch calls but may be involved in the routing decisions needed to complete a call as is the SCP. SMS 106 is an architecturally defined processor that provides the ability to create new services by providing an easy interface to the applications on SCP 102.

It is important to recognize that the WIN Architecture has an automatic and network based method of tracking the location of the mobile telephones. Mobility management does not require user intervention. Furthermore, the WIN has applications based in the network that are available to individual subscribers when authorized in the subscriber profiles stored in the HLR.

Figure 2:
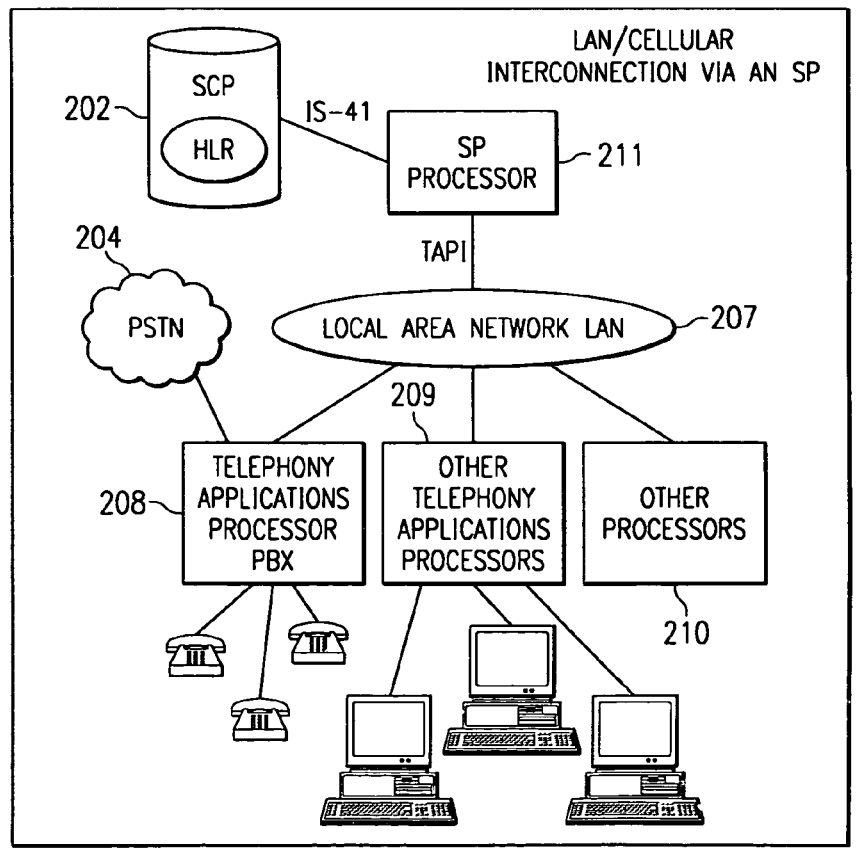
FIG. 2 illustrates a preferred embodiment of the invention showing a Local Area Network/Cellular interconnection according to the present invention.

FIG. 2 depicts a preferred embodiment of the subject invention, transaction side version. It is useful to review this practical example to understand the details of the subject invention presented in the later drawings.

A Local Area Network, or LAN 207, is connected to: a PBX application processor 208, other telephony application processors 209, other processors 210, and SP Processor 211 that executes the software embodiment of the subject invention. All processors communicate with LAN 207 over any one of a number of standard and well known methods used in commercial LAN configurations (e.g. Token ring, or Ethernet). Also, any one of a number of protocols can be used to communicate over these transports (e.g. TCP/IP, NETBEUI), neither method is material to this invention. The applications that need to access telephony information 208, 209 will implement one of a number of Telephone Application Programming interfaces. In this example we have shown the use of Microsoft Corporation's TAPI. The application opens TAPI defined channels to the SP and communicates with it in a manner defined by TAPI.

SP Processor 211, using the subject invention, translates TAPI into messages that are recognizable to the cellular network, in this example IS-41 commands, which are then transmitted to and from SCP 202 via an X.25, TCP/IP or other private or public data link. As TAPI does not define messages knowledgeable about mobility, the subject invention also provides logical mapping of the requests between the two networks. For example, TAPI does not provide for the equivalent of REGISTRATION on the network. The subject invention then infers REGISTRATION when the TAPI message indicates that the telephone is in use. The subject invention then takes that fact and launches a REGISTRATION notification message to the HLR. A complete table of the mapping of IS-41 messages to functions is provided in Table 1 It will be understood that other messages and functions can also be included in the mapping.

TABLE 1

| IS-41B Message Name (Total Message Set) | IS-41 Defined Usage. (SP is logically located as an MSC) | SP Required Support |
| --- | --- | --- |
| Handoff Measurement Request | From Serving MSC to adjacent MSC | SP will not launch this message. If received, SP is to return an error; Operation Not Supported. |
| Facilities Directive | From Serving MSC to Target MSC | SP will not launch the message. If received, SP is to return an error; Operation Not Supported |
| Mobile On Channel | From Target MSC to Anchor MSC | SP will not launch the message. If received, SP is to return an error; Operation Not Supported |
| Hand off Back | From Serving MSC | SP will not launch the message. If received, SP is to return an error; Operation Not Supported. |
| Flash Request | From Serving MSC | SP will not launch the message. If received, SP is to return an error; Operation Not Supported. |
| Hand off To Third | From serving MSC | SP will not launch the message. If received, SP is to return an error; Operation Not Supported. |
| Qualification Request | From MSC-V to HLR | SP will launch this message to determine if the SUB has a valid and authorised MIN on the cellular network. If received, SP is to return an error; Operation Not Supported |
| Qualification Directive | From HLR to MSC | SP will receive this message and record the contained profile settings. SP will not launch this message. |
| Registration Notification | From MSC to HLR | SP will send this message to indicate that the PBX extension is active and the SUB is now located at the PBX. If received, SP is to return an error; Operation Not Supported. |
| Registration Cancellation | From HLR to MSC | SP will receive this message to indicate that the SUB is now active at another location. SP will not launch this message. |
| Location Request | From MSC to HLR | SP will send this message when it has the SUB as inactive on the PBX and a call pending. If received, SP is to return an error; Operation Not Supported. |
| Routing Request | From HLR to MSC | SP will receive this message and return the proper routing number to reach the SUB. The SP will launch this message if it |

TABLE 1-continued

| IS-41B Message Name (Total Message Set) | IS-41 Defined Usage. (SP is logically located as an MSC) | SP Required Support |
|---|---|---|
| Remote Feature Control Request | From MSC to HLR | has a call pending and the SUB is not active on the PBX. SP will send this message to allow the SUB to change the mobile features from the office extension. If received, SP is to return an error; Operation Not Supported. |
| Service Profile Request | From MSC to HLR | SP will send this message to confirm the SUB's mobile configuration. If received, SP is to return an error; Operation Not Supported. |
| Service Profile Directive | From HLR to MSC | SP will receive this message and up date the current profile for the mobile. This message will not be sent by the SP. |
| Transfer To Number Request | From MSC to HLR | SP will send this message to request transfer to number information. |
| CSS Inactive | From MSC to HLR | SP will send this message to show that the SUB is no longer active on the PBX. If received, SP is to return an error; Operation Not Supported. |
| Redirection Request | From MSC to originating MSC | This message will not be implemented as it will require that the SP has an SS#7 address to allow messages from the originating MSC. There are currently no plans to allow the SP to have such an SS#7 address. |
| Call Data Request | From MSC to HLR | This message will not be implemented. If received, SP is to return an error; Operation Not Supported. |
| All set of O&M messages: Block; Unblocking; ResetCircuit; TrunkTest; TrunkTestDisconnect; UnreliableRoamerDataDirective | | These messages are not supported by the SP. If received, SP is to return an error; Operation Not Supported |

SP Processor 211 translates messages from TAPI to IS-41 and back, and contains HLR-like information relating to applications within LAN 207.

Figure 3:
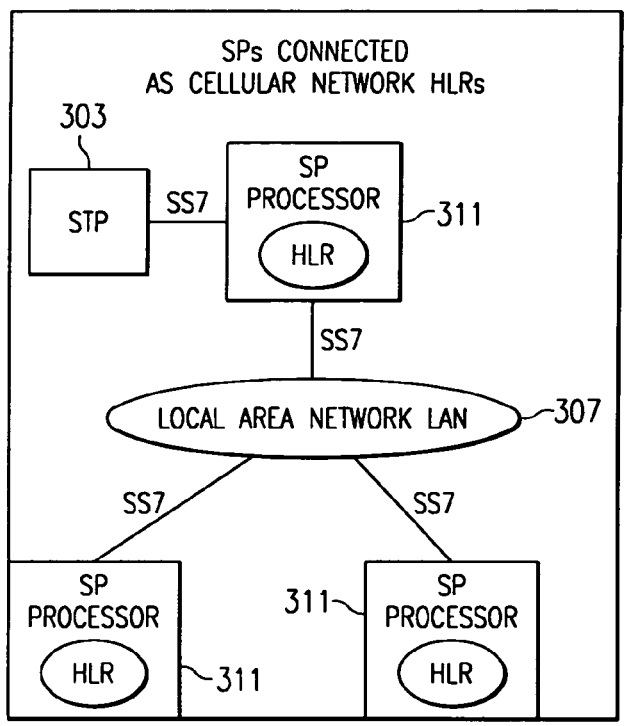
FIG. 3 illustrates SP processors connected to a Local Area Network (LAN) and connected to a cellular operator's service transfer point by an SS7 link.

FIG. 3 depicts use of SP processors 311, connected to LAN 307, and connected to the cellular operators' STP 303, via an SS7 link. In this embodiment of the invention, SP processor 311 implements the SCP based applications within the same processor or distributed processors on LAN 307. The subject invention then translates from the IS-41 messages as in FIG. 2 into applications that execute locally instead of on the SCP. In this embodiment, the local application replaces the SCP based ones by providing a standard interface to the mobile network to allow less expensive implementation of SCP type applications.

Figure 4:
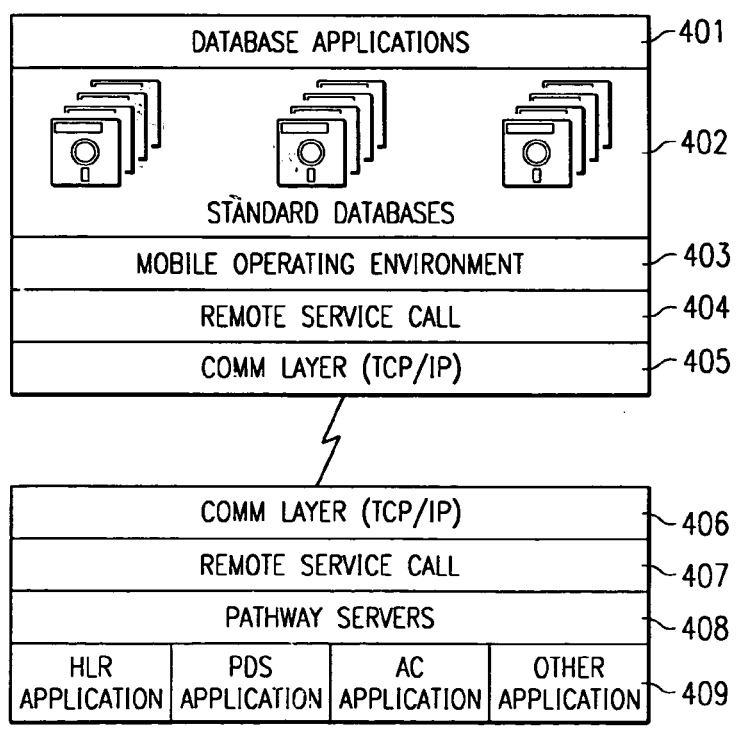
FIG. 4 illustrates the layering of the communications and applications that embody the connections used in one embodiment of the invention.

FIG. 4 shows the layering of the communications and applications that embody this type of connection. Database applications 401 written in any number of languages access standard databases for information, (e.g. SQL) 402. Those databases 402 are populated and updated from the network through the subject invention referred to here as the Mobile Operating Environment (MOE) 403. MOE 403 converts standard database requests into remote server calls 404 or other suitable and generally available transaction processors that coordinate with the SCP vendor specific database. In FIG. 4 the remote server call and pathway servers are commercially available products. The communications layer is similarly a commercially available product.

This embodiment converts standard database requests into the specific database transaction for the SCP application database 409 allowing highly available applications to extract and process subscriber profile information.

Figure 5:
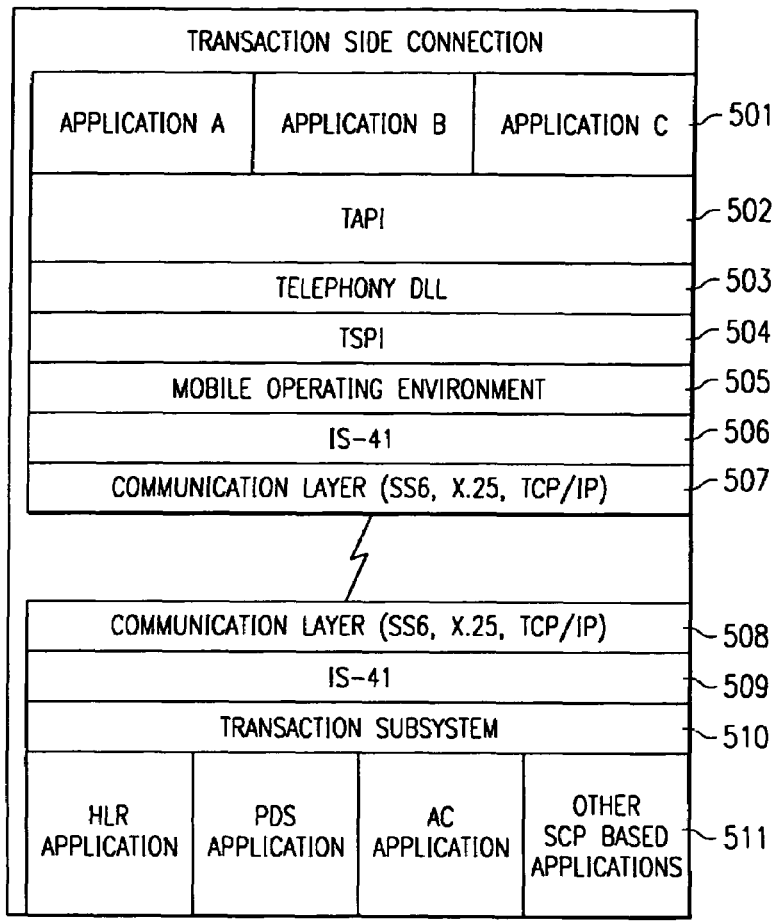
FIG. 5 illustrates the layers on the transaction side connection of the network interface.

As shown in FIG. 2 the PBX-cellular connection is an example of the Transaction side connection embodiment of the subject invention. FIG. 5 shows the logical connection of the various software components to complete the connection. Applications 501 executing on the LAN use an application programming interface (API) and in this example Microsoft's TAPI 502, which connects to the telephony dynamic link library (DLL) 503 and then to the telephone service provider interface, TSPI 504. The subject invention, MOE 505 maps the calls from the TAPI/TSPI 502 into the IS-41 messages 506. The messages are then carried over a communications layer 507 to the SCP 102. Items 508, 509, 510 and 511 are internal to SCP 102. As this invention relies solely on converting the LAN based TAPI into IS-41, the sub-systems internal to the SCP are not material and are shown here for example only.

Figure 6:
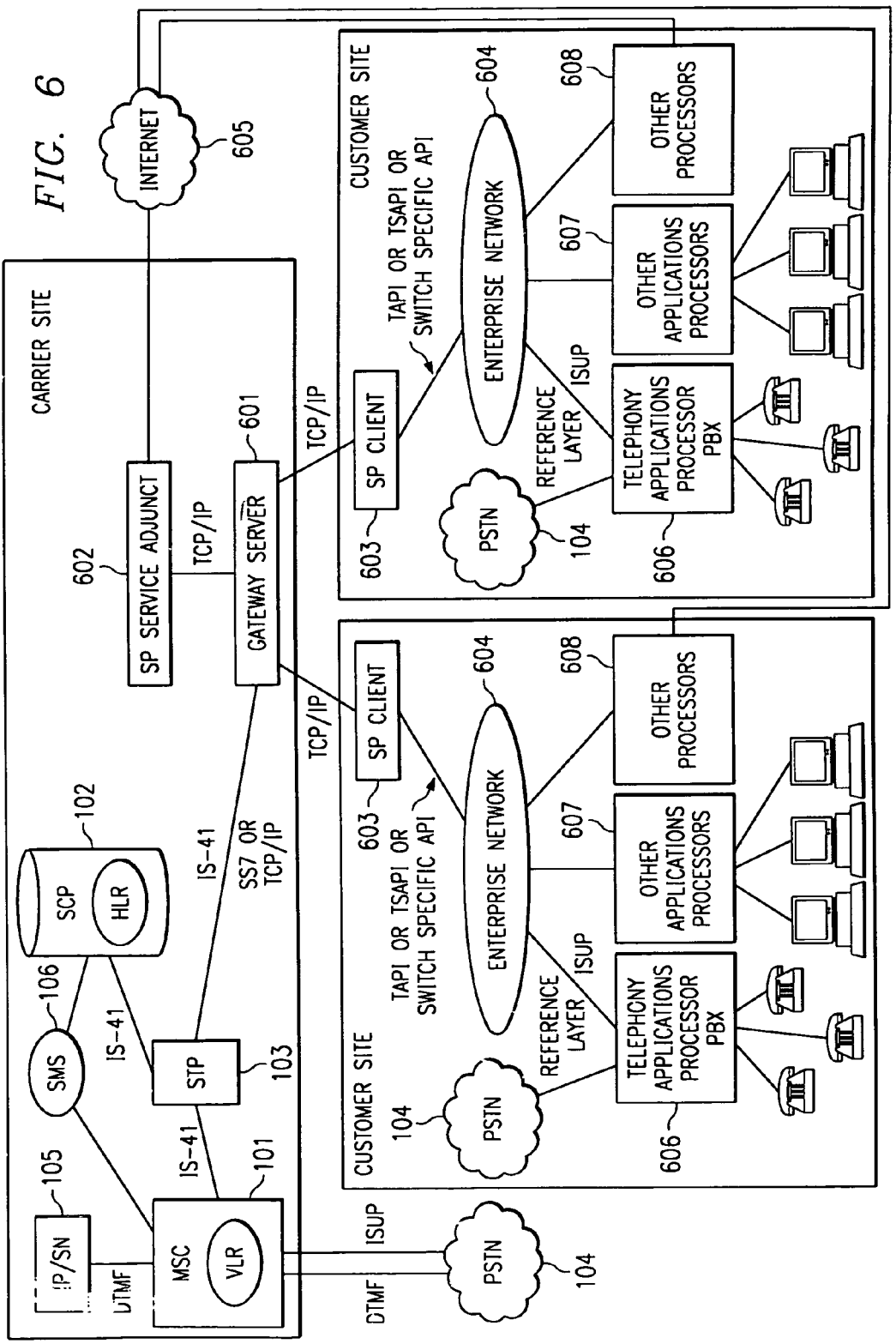
FIG. 6 represents a preferred embodiment of the invention showing interconnections between a gateway server, a service adjunct and an enterprise network, and a WIN STP.

FIG. 6 shows a practical method of interconnection of the SP Client, private network applications, application adjunct and SP gateway with the cellular network.

The wireless network is connected by an SS7 or TCP/IP link from a network's STP and communicates via IS-41 messages with SP gateway server 601. This gateway serves as an intelligent router that redirects incoming IS-41 messages to the appropriate enterprise network or adjunct server.

The office telephone system, either a Private Branch Exchange (PBX) or key system 606 is configured with a normal digital telephone supplied by the manufacture of 606. The telephone system 606 may require software or specific configurations in order to support the interconnection to SP Client 603, and these are available from the manufacturer of 606 and can be added by those skilled in the art. This embodiment requires only that any one of a number of interfaces be provided. Some manufacturers require an adapter to effect the electrical interface to the computer that executes the PBX interconnection service and the SP client. Other manufacturers provide an interface directly from a digital set 606. Typically only one of these is provided. The manufacturer of also provides the Telephone Service Provider Interface (TSPI) or equivalent to allow applications executing on the application processors 606, 607, and 608 to interpret the messages from the SP Client 603. The application processors 607 and 608 are any computer that can run applications written by others, including Internet browser and e-mail client software. Typically this will be a personal computer, PC, and will use a wildly available operating system.

The TSPI provides a programmatic interface to interpret the specific states of the Mobile Related Station 606. The TSPI-SP Client 603 interface provides the programmatic interface for the Cellular/PBX interconnection application. This application is the part of the subject invention that determines call states of stations on the PBX and relates them to the status of the mobile phone. It also provides the reverse interface to provide the information from the wireless network and relates it to the station. This embodies a typical application that uses the SP client/gateway server connections.

The SP client 603 is the programmatic interface from the applications processors 606, 607 and 608 to the message level and is also part of the subject invention. It provides a standardized interface to allow enterprise network 604 applications to be supported by a cellular/PCS network. This interface layer will allow applications to be written using standard application development tools which will reduce the cost of implementation. The use of an SP client 603 allows the message creation and related processing to be distributed between the server and the client to optimize the transaction performance and further reduces the cost of implementation of the subject inventions. Connections to the Internet 605 or similar networks are treated as an "other processor" 608 in this figure.

SP Service Adjunct 602 is a programmatic interface to the message level and is also part of the subject invention. It provides a standardized interface to allow database, Internet service connections 605 and other applications to be supported by a cellular/PCS network. This interface layer will allow applications to be written using standard application development tools which will reduce the cost of implementation. The use of an SP client 603 allows the message creation and related processing to be distributed between the server and the client to optimize the transaction performance and further reduces the cost of implementation of the subject inventions.

The TCP/IP interface from the gateway server 601 to the SP client 603, and to the enterprise network 604 are commercially available and known to those skilled in the art. This embodiment assumes the use of TCP/IP communication protocol, however, any protocol can be used. TCP/IP cost is very low cost and further reduces the cost of implementation.

The SP Gateway Server 601 assembles messages from a number of client computers 602, 603 and converts the message into a protocol used by the wireless network. The network connection is made to the network Service Control Point (SCP) 102, Service Transfer Point 103 or Mobile Switching Center 101 in a normal manner known by those skilled in the art.

The preferred exemplary embodiment of the subject invention describes a connection between a cellular network, based on the WIN architecture, and a private network that hosts a PBX application. The functionality of the "sub SCP" (SP) is described, and, the implementation of cellular PBX interconnection is described as a sample application, extended by the SP interconnection. Other applications can be applied using the same architecture, including, but not limited to:

call redirection and auto follow me service. (calls to the cell or PBX number are automatically directed to the station where the person is most likely to answer);

fixed cell forwarding using PBX trunks (calls to the PBX number while the cell phone is fixed forwarded will result in the forwarding done at the PBX not the cell switch);

integration with pagers and meet me bridges. (calls to a PBX will invite the caller to leave a message or wait. System will page the subscriber to call in and join the call to the caller);

PBX voice mail message waiting indication on cell phone (voice mails left on the office PBX will cause an indication on the cellular telephone);

call screening based on CLID, time of day etc. (each PBX subscriber will be able to develop a screening list to route callers to local voice mail of cellular telephone depending on criteria);

screening list management from the cell phone;

the number and type of PBX messages will be displayed on the cell phone; and

PBX set feature control via the cell phone.

Additionally, with the TSAPI extensions provided by the SP other CTI applications can be easily and quickly developed.

The SP element of the subject invention consists of a process, resident on a processor located on the connection between the cellular network SCP and an application running on the private network, that translates TSAPI or other CTI protocols to IS-41 or future WIN protocols. This extension allows CTI applications software to be extended with mobility features.

The SP process is connected to a cellular network-based SCP via an X.25 or similar private network connection. Signals and network messages from this connection are translated by the SP into TSAPI messages for use by applications processes resident on the private network to which the SP is connected.

Under the currently described implementation, the SP would support the following IS-41 messages to support an application such as cellular/PBX interconnection and refers to the Transaction side connection depicted in FIG. 5

Additionally, the subject invention describes a connection between a cellular network, based on the WIN architecture, and a private network that hosts network applications such as PBXs, and an application adjunct that hosts a particular set of applications, and a connection to an Internet or Intranet server, or enterprise database to deliver information based on certain IS-41 messages from the cellular network.

The subject embodiment consists of a process, resident on a processor located on the connection between the cellular network SCP, STP, or MSC and an application running on the private network, and an open application adjunct that translates TSAPI, TAPI or JTAPI or other CTI protocols to IS-41 or future WIN protocols. This extension allows CTI applications software to be extended with mobility features.

The SP is also connected via a second X.25 or similar private network to a network management center, where billing and provisions will be managed, and where network operations will be monitored. Network management messages would use existing commercially available Simple Network Management Protocol (SNMP) to manage the SP processors remotely.

Furthermore, the SP process can be extended with an SS7 link in order to allow the SP process to serve as a general SCP/HLR in the cellular carrier's network. This will allow carriers to lower operating costs by having a software-based HLR process that can run on lower cost server-class PC's or similar processors. In this instance, the SCP process would be located on one of the cellular carrier's own private networks to ensure security and accessibility.

Call control is initially built on the IS-41 standard as it contains the required call processing commands and will require a minimum of re-programming at the SCP side. As new features develop a different or enhanced protocol may be required to provide the enhanced functionality that will result. The architecture of using the SP will continue for the foreseeable future as it will reduce the transaction capability and communication costs to the SCP while allowing extensive customization with the various PBX interfaces as well as other CPI applications that may exist at the customer's site.

A number of applications can be resident on the private network that can benefit from the SP interconnection to the cellular network. One such application is that of a PBX. The functioning of the PBX application, connected via the SP to the cellular network is further described as a preferred embodiment of the subject invention.

Cellular/PBX interconnection extends the PBX private network application with the inherent mobility management information that is contained in the cellular network. The SP converts a TSAPI link status, that is used by the PBX, into the IS-41 protocol that is supported by the HLR.

PBX users will have a number of configurable options that can customize the call treatment to suit the particular requirements. In general, however, features operate as follows:

The Subscriber (SUB) will select which number, either the cellular number or the PBX number, is to be the primary contact number.

The last active location of the SUB will be tracked by the cellular based HLR. The HLR currently tracks active or registered mobile phones through the use of a protocol to the actual handset. Such a protocol does not exist with the PBX set, however, as the set is fixed, the system will infer activation if the set is used to receive or place calls.

The PBX detects set activity and passes this information to the PBX Interface Processor (SP) through the CTI link.

The SP converts the status information into IS-41 messages and launches the transactions to the HLR. It interprets the responses and launches routing directives to the PBX through the CTI link.

Calls routing to the cellular number first will complete to the mobile if active. If the subscriber is actually active on the PBX, the HLR will launch a RoutRequest to the SP and confirm the routing digits. These digits will be treated exactly the same as a TLDN used to set up a call in the cellular network.

Calls routing to the PBX first will complete to the PBX extension if active. If the extension is not active, the SP launches a LocationRequest to the HLR to obtain the TLDN if active or an AccessDeniedReason if not active. Routing to the defined coverage path then en completes the call.

The preferred embodiment allows the individual user the ability to specify either the mobile phone or office phone as prime. Callers can dial either the office number or the mobile number and be routed as outlined in Table 2. This embodiment requires that the user define the voice mail system and the prime phone to be the same. Future service offerings will allow the voice mail system to be chosen independently from the telephone prime.

TABLE 2

| Office Phone Status | Mobile Status | Which number prime? | Call completed to: | No answer routing |
| --- | --- | --- | --- | --- |
| Idle and active | Any | Office | Office | Office voice mail |
| Idle and inactive | Idle and active | Office | Mobile | Office voice mail |
| Inactive | Inactive | Office | Office voice mail | N/A |
| Busy and active | Any | Office | Office voice mail | N/A |
| Any | Idle and active | Mobile | Mobile | Mobile voice mail |
| Any | Busy | Mobile | Mobile voice mail | N/A |
| Idle and active | Inactive | Mobile | Office | Mobile voice mail |
| Inactive | Inactive | Mobile | Mobile voice mail | N/A |

It should be noted that the term "wireline(d)" is used to describe the basic network with or without telephones and includes a private network. A resident application includes telephones and PCS. The term "wireless" includes applications that are connected to a PCS and can be independent of a PCS.

Figure 7:
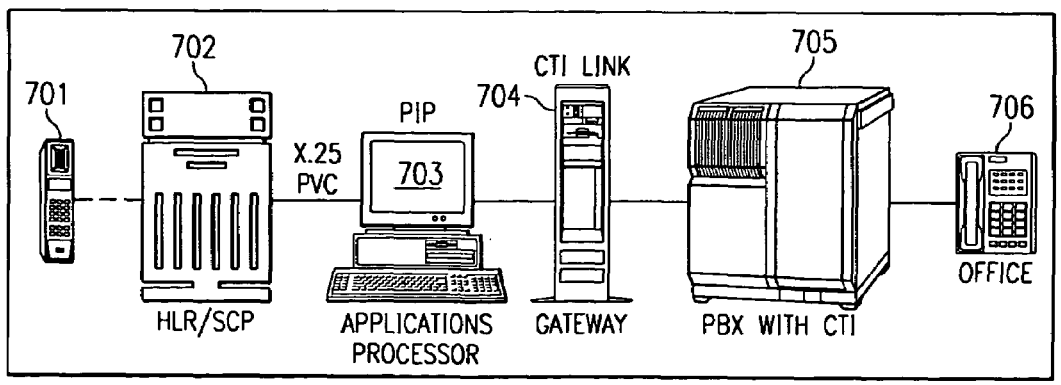
FIG. 7 is a block diagram of a preferred embodiment of the invention showing a wireline network connected to the wireless network.

Another exemplary embodiment of the present invention provides a system for automatic call redirection between wireless and wireline networks. FIG. 7 is a block diagram of a preferred embodiment of the invention showing a wireline network connected to the wireless network. Wireline telephone 706 associated with PBX 705 is set to 'active' when any activity is detected on wireline telephone by PBX 705. Such activity may include an outgoing call, an incoming call, entering a code such as a dialed number or simply lifting and replacing the handset on wireline telephone 706. Other activities or events can also be used to imply that the user is active on wireline telephone 706.

Wireline telephone 706 is set to 'inactive' status when the user is believed to have left the vicinity of the wireline telephone. For example, if the user fails to answer an incoming call to wireline telephone 706 the state is set to 'inactive.' When the user is detected as being active on the wireline telephone, the state of the wireline telephone may be changed from 'inactive' to 'active.' If there is no answer at the wireline telephone, and there is no answer at the wireless telephone, then the state of the wireline telephone is set to 'unknown.'

When the state of wireline telephone 706 is detected to be active, calls to wireless telephone 701 are automatically forwarded to wireline telephone 706. PBX 705 passes the activity information to the SP, which converts the status information into IS-41 messages and notifies SCP 702 of the active status of wireline telephone 706. SCP 702 then sets the incoming call destination to wireline telephone 706. Thus, when an MSC queries HLR 702 with a location request, HLR 702 returns the number of wireline telephone 706 as the forward-to number for wireless telephone 701. The MSC then connects the call to wireline telephone 706 through the PSTN. Thus, once the state of wireline telephone 706 has been set to active, calls to wireless telephone 701 are redirected to wireline telephone 706 automatically. The advantage of this type of system is that the user does not have to manually set the call-forward-immediate feature of wireless telephone 701 in order to receive calls on the office extension. Furthermore, even if the user forgets wireless telephone 701 at home or in the car, or forgets to set the call-forward-immediate feature, calls to wireless telephone 701 are automatically forwarded to wireline telephone 706. The state of wireline telephone 706 remains active as long as the user continues to answer incoming calls.

In an another embodiment, the SP activates the call-forward-immediate feature of wireless telephone 701 with the forward-to number as the directory number of wireline telephone 706. In this embodiment incoming calls to wireless telephone 701 are automatically re-directed to wireline extension 706 by HLR 702, which contains information about the subscriber.

If desired, call screening may be provided so that certain calls to wireless telephone 701, based on time of day, day of week, caller identification or other relevant criteria, are forwarded to wireline telephone 706. If the call does not meet preselected screening criteria, it may be forwarded to another destination, such as voice mail.

In the embodiments described above, if the user fails to answer a call on both wireless and wireline telephones 701 and 706, then the state of wireline telephone 706 may be set to 'unknown.' In one embodiment, this is accomplished by the SP notifying SCP 702 of the 'unknown' status. The call-forward-immediate feature of wireless telephone 701 may also be deactivated by SP 702. When the status of wireline telephone 706 has been set to 'unknown' all calls to wireless telephone 701 are terminated at wireless telephone 701 or at another preselected destination, such as voice mail. The 'unknown' state of wireline telephone 706 is maintained until the user is found to be 'active' on wireline telephone 706.

In the embodiments described above, if a call is made to wireline telephone 701 and the user fails to answer the call, then the SP first determines if wireless telephone 701 can receive the call, that is whether wireless telephone 701 is active and registered in the network. This is accomplished by the SP first issuing a location request to the home HLR for wireless telephone 701. If wireless telephone 701 is registered with the network serviced by HLR 702, HLR 702 will supply a Temporary Local Directory Number (TLDN) to the MSC, which then completes the call to wireless telephone 701. If wireless telephone 701 is not registered with the network, then HLR 702 returns a signal indicating that wireless telephone 701 is not active. Thus, the call intended for wireline telephone 706 will not be forwarded to wireless telephone 701, but is forwarded to a previously agreed upon number, such as the voice mail for wireline telephone 706 or another telephone associated with the user.

If desired, call screening can be provided with the above embodiments so that only certain calls to wireline telephone 706, based on time of day, day of week, caller identification and other relevant criteria, are forwarded to wireless telephone 701. If the call does not meet the criteria for call screening, it is forwarded to an alternative preselected destination, such as voice mail.

SECOND PREFERRED EMBODIMENT.

The second preferred embodiment of the invention provides an improved means for contextually-based information delivery to a mobile subscriber. This described embodiment provides two such services, however, the embodiment is by no means limited to simply these services.

Telecommunication service provider switches have a vast array of service features. These service features today require the subscriber to remember the star code numbers in which to activate/de-activate the features. An appropriately configured information delivery service would enable the subscriber easy access to these services via a text based screen menu interface that translates the star codes the network understands.

A service for the travel vertical market, especially for Airlines and airports, can be implemented using a targeted text based messaging service that automatically sends important information directly to the wireless subscriber regarding his/her specific flight and travel status. Information such as connecting flight time and gate status, directions to the closest frequent flier lounge, current frequent flier miles balance, driving directions to a hotel, etc. would be sent automatically to the subscriber as soon as the mobile handset is turned on at the airport. In addition, important names of service providers and/or names of friends/business associates would be presented on the subscriber's handset screen. By highlighting the desired name or service provider and hitting the Send button, a call would be made.

This service is a major enhancement to the existing Internet searching services available today. Instead of being required to search for information, the subscriber, in the subject invention, is automatically sent to his wireless handset based on his location, the time of day, or any other triggered parameter as established by commercial entities, wireless carriers, and/or the subscriber. These triggers can include triggers from the network, or a trigger from a data source, such as a change in a stock price that is above a certain threshold.

In this service, an event trigger, such as an IS-41 Origination Request message, or a data trigger such as a stock price change, is noted by the application adjunct, or the MOE client. Based on this trigger, the application software logic retrieves the needed information.

THIRD PREFERRED EMBODIMENT.

This embodiment provides the ability for a wireless carrier to offer its subscribers use and access of a newly established wireless network of wireless and wireline telephone numbers. This network would allow subscribers to add frequently dialed numbers to the network's database; and then dial only the last seven digits (or number of digits as decided by the wireless carrier) of the telephone number regardless of where he or she is calling from. The service application logic, resident on the wireless network service adjunct, would determine the appropriate area or country codes and add these additional codes on to the dialed number as required. The subscriber's long distance calling card arrangements would be applied automatically to any calls where long distance charges apply. The wireless carrier would provide all applicable charges to the call and bill the subscriber accordingly. The wireless carrier may determine that this new network is truly an innovation to the way calls are traditionally dialed and completed today and develop an entirely new billing structure, bundling calling card and long distance services into this new calling arrangement.

Additional service arrangements under this embodiment make other private network calling capabilities possible. A personal private calling network is one such service arrangement. This service provides the ability for a subscriber to develop his or her own personal private calling group or network. This calling group would consist of any telephone numbers the subscriber calls on a regular basis whether they be personal or business related calls. After the subscriber's calling group has been established, the subscriber need only a limited number of digits of the calling number regardless of where the subscriber is calling from, as long as the number being called is included in the private calling group. Therefore, wherever the subscriber is roaming, the intelligence provided by this embodiment of the subject invention in the IS-41 based network will enable the completion of the call. Likewise, if other subscribers have the subscriber in his or her personal private calling group, the call would be completed to the called subscriber's wireless communicator regardless of where the called subscriber is located.

Additionally, this embodiment of the subject invention may be integrated with various scheduling software programs. For example, a subscriber could highlight the 25 numbers in their Microsoft Schedule+ to be accessed during a particular trip. By using the architecture of the subject invention, and sending the identified 25 numbers, the wireless intelligent private network could be updated with the subscriber's updated list of numbers. The subscriber's account could be updated as often as the subscriber chooses to do so.

FOURTH PREFERRED EMBODIMENT.

The subject invention, using the number translation features of the third embodiment above, connects to the computer scheduling systems of mass media broadcasting (radio and TV) stations using any one of a number of commercially available communications links. Using the schedule of events taken from the broadcasting station's scheduling system, the subject invention would be used to modify the translation of the dialed number in real time. This will allow routing of calls to vary in conjunction with the broadcast events (advertising, or events).

For example, a radio station may utilize this embodiment to allow listeners simplified access to specific advertisers or to information. A radio station may inform listeners that a specialized advertising feature may be accessed by dialing *###X with a wireless phone, where ### represents the frequency of a radio and X represents a desired option available to listeners. For example, in this embodiment, a listener would dial *9010 to access the service associated with option 0 from a station broadcasting on 90.1 FM. For example, option 0 may represent being connected to the advertiser of the ad currently being broadcast by the station. Option 1 may represent being connected to the advertiser for the previous ad. Alternatively, option 2 may present menu options for the listener.

Accordingly, a listener may hear an advertisement and dial #9010. The invention may determine the current advertisement from scheduling information received via a communication link. Utilizing this determination, the invention performs a look-up of the appropriate number to which the caller should be routed. The invention then routes the listener's call to the appropriate number. The destination telephone number to which the calling listener is routed may be selected depending upon the listener's location.

Alternatively, this embodiment may utilize other wireless system information to provide specialized services. Instead of routing all callers to a single number, the invention may utilize the wireless system's locating functionality to route a call to the retail establishment that is closest to the location of the caller. Moreover, the present embodiment may retain a record of callers connected to specific advertisers. The record may provide advertisers with direct feedback on the success of a given advertisement. Additionally, a service provider may coordinate billing activity by charging a transaction fee for each customer routed to the advertiser's phone number.

The invention may provide additional options to callers. For example, the invention may provide an initial menu of options, consisting of the last five advertisers. The menu may be presented through audio information associated with the call. Alternatively, the invention may cause a menu to be displayed upon a text-capable subscriber device. After receiving an initial selection from a caller, the invention may route the call in accordance with the caller's selection.

This embodiment does not necessarily require a connection to the broadcast station's scheduling system. The present embodiment may monitor the broadcast, itself, to detect mass media broadcast events. The invention may monitor the broadcast signal to identify particular advertisements. For example, the invention may utilize voice recognition techniques to detect keywords associated with a particular advertisement. Voice recognition techniques may also be utilized to ascertain the identity of a specific speaker associated with a particular event. Voice recognition technology is known, for example, voice recognition techniques are described in U.S. Pat. No. 5,787,395 to Minamino, the disclosure of which is hereby incorporated by reference. It shall be appreciated by one of ordinary skill in the art that any number of voice recognition systems may be utilized and the present invention is not limited to any particular technique or group of techniques. The voice recognition capability of the invention is especially useful in the radio broadcasting industry which frequently utilizes live advertisements by radio personalities.

This embodiment has been described in terms of wireless subscribers. However, the invention is not so limited. The invention may be implemented upon a wireline network or may function in an integrated wireline and wireless environment. Similarly, this embodiment has been described using broadcast events such as advertisements. However, the present embodiment may additionally utilize other events, such as songs, audio signal, video signal, or any combination thereof to modify call routing.

The subject matter of the instant invention has many immediate applications including airline travel, real estate, entertainment and personal finance and banking.

An initial application is airline frequent flier programs which are aimed at retaining their most valued, high-end customers. Providing easy access to program and current trip information for customers is a challenge for the airlines.

Today, frequent flier customers are provided with Internet web pages, special 800 numbers, and other varied means to obtain important information, such as the status of a tight airport connection. All of these options, however, require the customer to search for the information. Mobility management software eliminates the search by automatically sending important information directly to the wireless subscriber regarding his/her specific flight status, connecting gate information, directions to the closest frequent flier lounge, current frequent flier miles balance, driving directions, etc.

For example if a flier lands at Dallas/Fort Worth airport and must make a connection the flier powers on his/her mobile communicator in the terminal, causing a message to appear on the hand-set saying, "Welcome to Dallas/Fort Worth Airport, Mr. Smith. Your connection on flight 2309 to Tampa leaves at 1:20 PM from gate 12. You arrived at gate 27, so turn left as you exit the plane and your connecting gate will be 15 gates down. American's Eagle Lounge is located at gate 31; stop by for a drink. Your current frequent flier mile account balance is now 45,999." Continuing with the example, assume the traveler stops by the frequent flier lounge for food and drink. Thirty minutes before the flight a messages comes to Mr. Smith reminding him his flight leaves in thirty minutes. When Mr. Smith lands in Tampa, another message is sent informing him of the baggage claim area for his flight and directions to the Hertz rental counter. The next message are driving directions to the hotel where he is staying in Tampa. The hotel's telephone number as well as the three business associates he is scheduled to meet with, as well as several friends of his in the area, also appear with the message. By highlighting a particular number and hitting send on his communicator, a call can be made.

Another message to appear on Mr. Smith's communicator contains the names and telephone numbers of four of his favorite restaurants in Tampa. Depending on the selected name and number, the driving directions from the hotel to the restaurant also appear on the screen. The enabling mobility management provides personalized travel preference information in a personal profile database, continuous links to travel industry databases, intelligence (and security) of the digital wireless network to know where the subscriber's communicator is when it is powered on. The service is truly a valued added service for the busy frequent traveler. Travel industry businesses are enhanced by this software. For an airlines frequent flier customers, an airline may provide the communicator to these customers, or provide a means for customers to cash in frequent flier miles, so these differentiating type services can be capitalized upon.

Other travel industry applications include:

Up to the minute travel itinerary information from travel agencies;

Pre-identified sight-seeing directions and areas of interest;

Frequently used foreign language words and their translations;

Reminders of starting/closing times;

Weather forecasts where one is going on a trip, or is currently located;

Information as to what might be occurring back at the office, i.e. number of unread e-mail messages, numbers of unheard voice mail messages? announcements of scheduled meetings, etc; and Up to the minute interests in travel related activities where customer is currently located.

Another area of application is real estate agent communication management with clients, both selling and buying customers, and real estate professionals.

By the very nature of their jobs, real estate agents are very mobile workers. They are constantly on the move, showing homes to prospective buyers, meeting with sellers, previewing listed properties, running down purchase agreement paperwork, arranging mortgage applications, and managing closing activities. Maintaining constant contact with clients and real estate associates is essential to the success of these agents. Today, the average real estate agent carriers a pager. Many agents use a cellular telephone.

Real estate agents spend the minority of their time at the real estate office desks. However, many agents post their office number on for-sale signs, business card and the like. When clients call these main numbers, either a voice mail system takes a message (and pages the agent notifying them of a new voice mail message) or a receptionist answers the call and forwards the call to the voice mail box of the agent (and the same paging sequence occurs).

Mobility management software streamlines communications in a few important ways. One way is through the use of smart call forwarding capabilities. When a real estate agent is working at the office, the network knows she is at the office because she has turned off her wireless communicator, and therefore, calls made to her office number ring through to her desk. As soon as she turns on her wireless communicator, the network automatically forwards the call to her wireless device. In the event a main number for the entire office is used and the call is transferred to voice mail system, the call is automatically forwarded to the agent's wireless device as opposed to voice mail. Another way communication is streamlined is through new listing information automatically being sent to an agent's communicator. By multiple listing geographic reference number, price range, number of bedrooms, and other specific identifiers, an agent would pre-program the multiple listing information to be sent to his wireless communicator once a new listing appears. Especially in hot real estate markets, speed of information flow and communications to waiting buyers is key. This is a complete different model of information flow compared to today's manual database searches. Thirdly, a seller's real estate agent is dependent on maintaining up to the minute information on which agents have shown the seller's listed home. The current method of leaving business cards at the seller's home after the showing and then counting on the seller to contract the listing agent with the buyer's agent information is the basic process used today. A more direct communications method would be for the agent who is showing the home to use his wireless communicator to send a mobile originated message to the listing agent with the his name and number and his client's name and number.

Finally, maintaining the status of potential buyers who have been shown a seller's home is a tremendous challenge for real estate agents. This information is of great value to the seller, and providing constant status information to the seller, wherever he may be, on potential buyers is provided via mobility management software and real estate broker communications to the network.

A third example of the application of the present invention is personal investment portfolio information provided to an individual.

Staying abreast of personal investment portfolio information has grown into a very popular pastime for the investment minded individual. With the advent of on-line trading and querying of information, an entire industry is being built on electronic commerce. For the mobile professional, searching on-line is a difficult proposition. The challenge is to stay constantly in touch with one's personal investment portfolio and one's investment professional when the need arises to buy or sell.

Mobility management software ends the on-line searches and provides constant connections to personal investment portfolio information and investment professionals. Mobility management software and the wireless intelligent network provides for an investor to manage a database of personal investments, for example including all of the stocks he owns and the price he bought the stocks. The software is flexible to arrange for notification to the investor's wireless communicator of different triggers (i.e. send the stock price every time price changes, send stock price every half-hour). In addition, an investor's selected names and telephone numbers of investment professionals, such as his stock broker also appears at the bottom of the message. By highlighting the stock broker and hitting the send on the communicator, the investor is able to call instantly and order a trade.

Other personal finance/banking applications include:
receiving current bank account balance information;
receiving urgent notification when account balances reach certain levels;
receiving notification that automatic payments have been made for cars, houses, and other automatic payment items;
receiving notification that direct deposits to bank accounts have been completed; and
receiving credit card balance and latest transaction information.

A final example of the use of the instant application are amusement park event schedule and instant connection to guide information.

Amusement parks, such as Disneyland, schedule different daily events and shows. These are very popular and grabbing the day's schedule of events is the first order of business as one enters the park and races to the most popular ride. Producing and printing daily event schedules is an expense for Disneyland and customers like to have an ability to call a central information center to make lunch/dinner reservations, find out the day's park hours, etc. Customers have trouble organizing their day's activities until they find out the day's schedule. Another customer irritant is racing to a particular ride to discover the ride is closed for a certain time during the day. This information is sent to a customer's wireless communicator. Mobility management software sends the day's specific events and times to a customer's communicator. In addition, special information numbers as organized by subject appears on the communicator and the customer highlights the needed information and press "send" and hear and/or communicate the needed information. Disneyland helps promote the use of this service by giving discounts and priority lunch and dinner reservations to customers who use this software and wireless communications capability.

Other entertainment industry applications include:
receiving movie listings and time schedules depending on where the customer is located;
movie theater identifier information appears with the information;
information regarding players/teams sent to communicator during sports events; and
entertainment event schedule information and reservations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing information to users via communications devices associated with said users, said method comprising the steps of:
receiving a digits request trigger from a communication device, wherein the digits request trigger is a signaling message that is associated with a call set-up process, the digits request trigger comprising dialed digits or a feature code, whereby a communications network attempts to establish a call connection between a user that initiates the digits request trigger and a called number associated with said dialed digits or feature code;
identifying a user associated with said digits request trigger;
correlating said digits request trigger with specific information requests for said user;
retrieving said specific information; and
sending said retrieved information to said communication device for display to said user.

2. A system for providing information to a wireless network subscriber in response to a digits request trigger or a SMS origination message, comprising:
means for receiving said digits request trigger from said wireless network, wherein the digits request trigger is a signaling message that is associated with a call set-up process, the digits request trigger comprising dialed digits or a feature code, whereby a telecommunications network attempts to establish a call connection between a user that initiates the digits request trigger and a called number associated with said dialed digits or feature code;
means for correlating said digits request trigger to requested data, wherein said correlating means accesses a user profile database to identify said requested information for a particular digits request trigger;
means for retrieving data corresponding to said digits request trigger; and
means for sending said retrieved data to a user who initiated said digits request trigger.

3. An information system for a wireless network comprising:
a wireless web information services gateway coupled to said wireless network and capable of receiving digits request triggers from said wireless network, wherein the digits request trigger is a signaling message that is associated with a call set-up process, the digits request trigger comprising dialed digits or a feature code, whereby a telecommunications network attempts to establish a call connection between a user that initiates the digits request trigger and a called number associated said dialed digits or feature code;

means for correlating digits request triggers to requested information, wherein said correlating means accesses a user profile database to identify said requested information for particular digits request trigger;

means for retrieving said requested information; and means for sending said requested information to subscribers on said wireless network.

* * * * *